(12) United States Patent
Guo et al.

(10) Patent No.: US 12,388,138 B2
(45) Date of Patent: Aug. 12, 2025

(54) BATTERY PACK LOWER BOX BODY, BATTERY PACK, APPARATUS, AND ASSEMBLY METHOD OF BATTERY PACK LOWER BOX BODY

(71) Applicant: CONTEMPORARY AMPEREX TECHNOLOGY (HONG KONG) LIMITED, Hong Kong (CN)

(72) Inventors: Ying Guo, Ningde (CN); Zesheng He, Ningde (CN); Ziqiang Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 779 days.

(21) Appl. No.: 17/729,413

(22) Filed: Apr. 26, 2022

(65) Prior Publication Data
US 2022/0255172 A1    Aug. 11, 2022

Related U.S. Application Data

(63) Continuation of application No. PCT/CN2020/123465, filed on Oct. 24, 2020.

(30) Foreign Application Priority Data

Oct. 31, 2019    (CN) .......................... 201921856972.5

(51) Int. Cl.
*H01M 50/209*    (2021.01)
*H01M 50/249*    (2021.01)

(52) U.S. Cl.
CPC ....... *H01M 50/209* (2021.01); *H01M 50/249* (2021.01); *H01M 2220/20* (2013.01)

(58) Field of Classification Search
None
See application file for complete search history.

(56) References Cited

U.S. PATENT DOCUMENTS

| 5,716,155 A | 2/1998 | Yoshida et al. |
| 9,533,600 B1 | 1/2017 | Schwab et al. |
| (Continued) | | |

FOREIGN PATENT DOCUMENTS

| CN | 103318258 A | 9/2013 |
| CN | 105857412 A | 8/2016 |
| (Continued) | | |

OTHER PUBLICATIONS

ISR for International Application PCT/CN2020/123465.
(Continued)

*Primary Examiner* — Basia A Ridley
*Assistant Examiner* — Heng M. Chan
(74) *Attorney, Agent, or Firm* — Ladas & Parry LLP

(57) ABSTRACT

This application relates to the technical field of battery packs, and a battery pack lower box body, a battery pack, an apparatus, and an assembly method of battery pack lower box body are provided. The battery pack lower box body includes a box frame, a base plate, a stiffening beam, and a stiffener. The base plate is arranged at the bottom of the box frame; the stiffening beam is arranged inside a space enclosed by the box frame and on top of the base plate; and the stiffening beam is fixed to the box fame via the stiffener, and the stiffener is welded to the box frame to form a weld seam, where a length of the weld seam is kept greater than a sum of side lengths of a projection of the stiffening beam onto the box frame.

11 Claims, 3 Drawing Sheets

(56) References Cited

U.S. PATENT DOCUMENTS

2014/0014428 A1    1/2014  Yanagi
2017/0355255 A1*  12/2017  Brausse ............. B62D 25/2036

FOREIGN PATENT DOCUMENTS

| CN | 207106626 U | 3/2018 |
| CN | 109131566 A | 1/2019 |
| CN | 209282267 U | 8/2019 |
| CN | 110370912 A | 10/2019 |
| CN | 210467949 U | 5/2020 |
| KR | 20050101048 A | 10/2005 |

OTHER PUBLICATIONS

Written Opinion for International Application PCT/CN2020/123465.
Extended European Search report for EP application No. 20882411.0, dated Dec. 7, 2022.

* cited by examiner

ABSTRACTBATTERY PACK LOWER BOX BODY, BATTERY PACK, APPARATUS, AND ASSEMBLY METHOD OF BATTERY PACK LOWER BOX BODY

CROSS-REFERENCE TO RELATED APPLICATIONS

This application is a continuation of International Patent Application No. PCT/CN2020/123465 filed on Oct. 24, 2020, which claims priority to Chinese Patent Application No. 201921856972.5 filed on Oct. 31, 2019. The aforementioned patent applications are incorporated herein by reference in their entirety.

TECHNICAL FIELD

Embodiments of this application relate to the technical field of battery packs, and in particular, to a battery pack lower box body, a battery pack, an apparatus, and an assembly method of battery pack lower box body.

BACKGROUND

In recent years, traction batter packs are increasingly in pursuit of light weight and high energy density. However, limitations of the structure of a vehicle body have led to a development trend toward maximizing grouping efficiency within limited installation space for battery packs. However, increasing the number of cells as much as possible in order to improve the grouping efficiency also has certain drawbacks, for example, less design space for other enhancement structures, challenging assurance of safety performance of the battery pack.

Therefore, a new type of battery pack lower box body, battery pack, apparatus, and assembly method of battery pack lower box body are urgently needed to solve the foregoing problem.

SUMMARY

Embodiments of this application provides a battery pack lower box body, a battery pack, an apparatus, and an assembly method of battery pack lower box body to reduce the risk of breakage of a weld seam formed between a stiffening beam and a box frame.

A first aspect of this application provides a battery pack lower box body, including:
  a box frame;
  a base plate arranged at the bottom of the box frame;
  a stiffening beam arranged inside a space enclosed by the box frame and on top of the base plate; and
  a stiffener, where the stiffening beam is fixed to the box frame via the stiffener, and the stiffener is welded to the box frame to form a weld seam: where
  a length of the weld seam is kept greater than a sum of side lengths of a projection of the stiffening beam onto the box frame.

The battery pack lower box body is welded to the box frame via the stiffener, and the length of the weld seam formed by welding the two is kept greater than the sum of side lengths of the projection of the stiffening beam onto the box frame, increasing the length of the weld seam between the stiffening beam and the box frame, thus enhancing structural strength of the weld seam, and thereby reducing the risk of breakage of the weld seam formed between the stiffening beam and the box frame.

In some embodiments, the stiffening beam and the stiffener are an integral structure. Such design can reduce assembly steps.

In some embodiments, the stiffening beam and the stiffener are split structures, the stiffener is provided with a first insertion hole, and the stiffening beam is inserted into the first insertion hole. Such design can reduce manufacturing costs.

In some embodiments, the stiffener is further provided with a second insertion hole communicating with the first insertion hole, and the stiffening beam is provided with a threaded hole; and
  a threaded member is provided inside the second insertion hole and the threaded hole, and the stiffening beam is fixed to the stiffener by the threaded member.

In some embodiments, along a width direction, two ends of the stiffening beam are provided with limiting faces, the stiffener has a first welding face welded to the box frame, and the limiting face abuts against the first welding face. In one aspect, providing the limiting face can ensure that the depth of insertion of the stiffening beam into the stiffener meets the requirements. To be specific, when the limiting face abuts against the first welding face, it means that the stiffening beam and the stiffener meet assembly requirements, and a next step of installation, for example, inserting the threaded member, can proceed. In another aspect, providing the limiting face can further ensure that the threaded hole is aligned with the second insertion hole in installation, thereby improving, installation efficiency.

In some embodiments, an area of the first welding face is larger than that of a projection of the stiffening beam onto the box frame. Such design can increase the area of the first welding face and thus increases the length of the weld seam.

In some embodiments, the box frame has a second welding face welded to the first welding face, and the first welding face is flush with the second welding face. Such design can ensure that the stiffener is reliably fixed to the box frame and the stiffener is welded to the box frame with ease.

In some embodiments, the box frame is provided with a slot formed by the second welding face recessed inwards, and the stiffener is accommodated in the slot. Such design allows the box frame to accommodate the stiffener.

A second aspect of this application provides a battery pack, including a battery module, a battery-pack upper box body and the foregoing battery pack lower box body, where the battery-pack upper box body is fixed to the battery pack lower box body, and the battery module is accommodated in the battery-pack upper box body and the battery pack lower box body.

A third aspect of this application provides an apparatus, including a driving source and the foregoing battery pack, where the driving source is configured to provide driving force for the apparatus, and the battery pack is configured to provide electrical energy for the driving source.

A fourth aspect of this application provides an assembly method of battery pack lower box body, including:
  providing a box frame including a base plate;
  arranging a stiffening beam inside a space enclosed by the box frame and on top of the base plate;
  fixing the stiffening beam to the box frame via a stiffener; and
  welding the stiffener to the box frame to form a weld seam, with a length of the weld seam kept greater than a sum of side lengths of a projection of the stiffening beam onto the box frame.

BRIEF DESCRIPTION OF DRAWINGS

To describe the technical solutions in the embodiments of this application or in the prior art more clearly the following briefly describes the accompanying drawings for describing the embodiments or the prior art. Apparently the accompanying drawings in the following description show some embodiments of this application, and a person of ordinary skill in the art may still derive other drawings from these accompanying drawings without creative efforts.

REFERENCE SIGNS ARE DESCRIBED AS FOLLOWS

Figure 1:
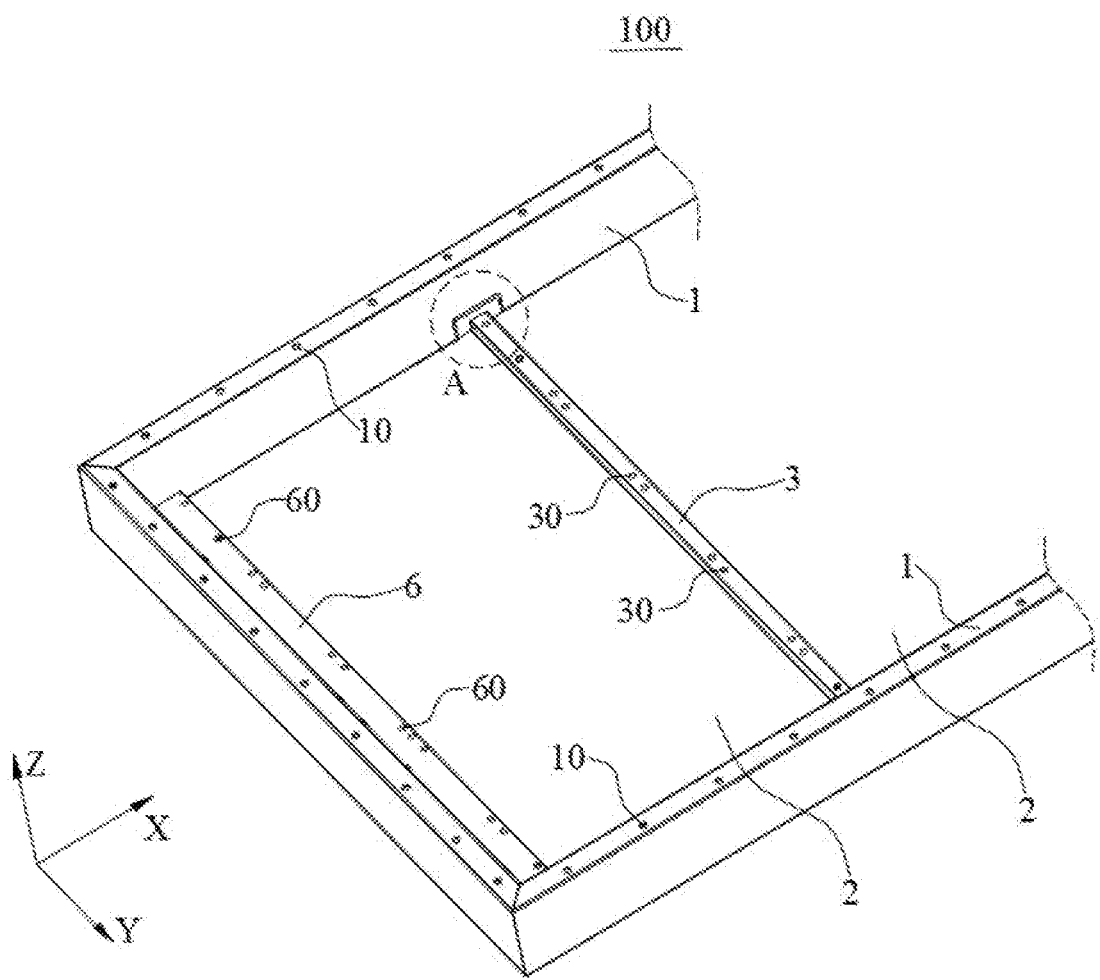
FIG. 1 is a schematic structural diagram of part of a battery pack lower box body according to a first aspect of the embodiments of this application.

M. battery pack;
100. battery pack lower box body;
200. battery-pack upper box body;
300. battery module;
1. box frame;
10. first connecting hole;
11. second welding face;
12. bottom face;
13. slot;
2. base plate;
3. stiffening, beam;
30. second connecting hole;
31. threaded hole;
32. limiting face;
4. stiffener;
40. threaded member;
41. first insertion hole;
42. second insertion hole;
43. first welding face;
5. weld seam;
6. battery fixing portion;
60. third connecting hole;
X. length direction;
Y. width direction; and
Z. height direction.

The accompanying drawings herein are incorporated into this specification as a part of this specification, illustrating the embodiments conforming to this application, and intended to explain the principles of this application together with the specification.

DESCRIPTION OF EMBODIMENTS

To make the objectives, technical solutions, and advantages of this application more comprehensible, the following describes this application in detail with reference to embodiments and accompanying drawings. It should be understood that the specific embodiments described herein are merely used to explain this application but are not intended to limit this application.

In the descriptions of this application, unless otherwise specified and defined the terms "first" and "second" are merely intended for a purpose of description, and should not be understood as an indication or implication of relative importance, and the terms "connection" and "fastening" should be understood in their general senses. For example, the "connection" may be a fixed connection, a detachable connection, an integral connection, or an electrical connection; or may be a direct connection, or an indirect connection through an intermediate medium. A person of ordinary skill in the art can understand specific meanings of these terms in this application as appropriate to specific situations.

In the descriptions of the specification, it should be understood that the directional terms such as "above" and "under" described in the embodiments of this application are described from angles shown in the accompanying drawings, and should not be understood as a limitation on the embodiments of this application. In addition, in the context, it should be further understood that when an element is referred to as being "above" or "under" another element, the element can not only be directly connected "above" or "under" the another element, but also be indirectly connected "above" or "under" the another element through an intermediate element.

In some cases, some battery pack lower box bodies are directly welded to box frames by using solid beams or extruded aluminum beams. Due to limited installation space, the stiffening beam has a relatively small cross-sectional area, while a weld seam formed between the stiffening beam and the box frame becomes the main force-bearing part of the two. Therefore, the weld seam is prone to breakage in long-term turbulence or severe collision.

Figure 2:
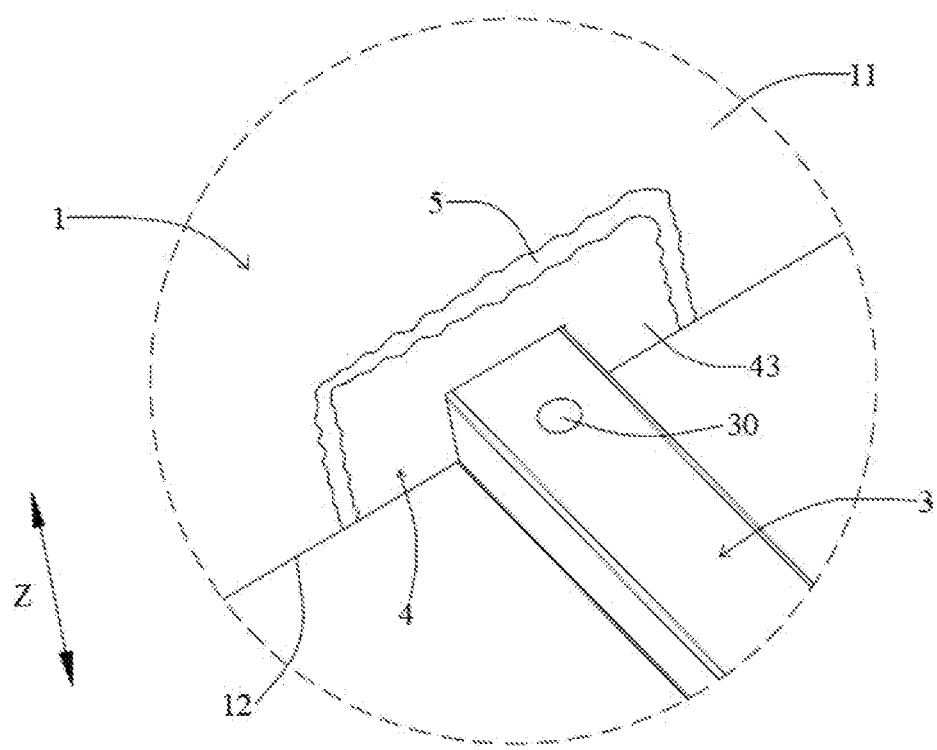
FIG. 2 is an enlarged view of position A in FIG. 1.
Figure 3:
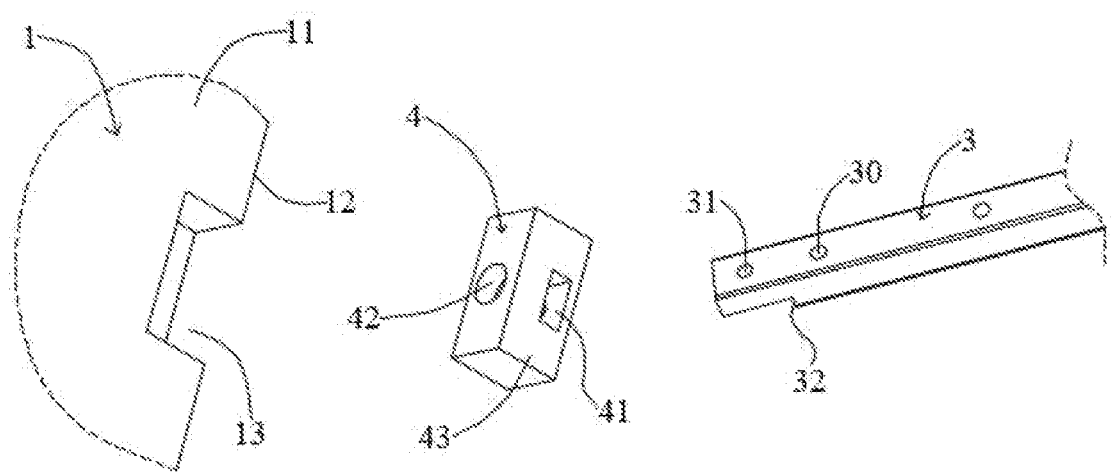
FIG. 3 is an exploded view of a box frame, stiffener, and stiffening beam in FIG. 1.
Figure 4:
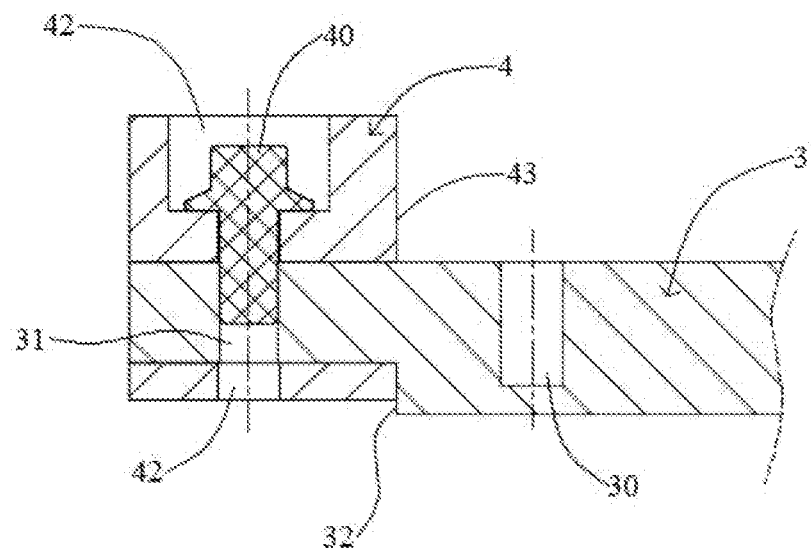
FIG. 4 is a schematic cross-sectional view of a stiffener and stiffening beam in FIG. 1.
Figure 5:
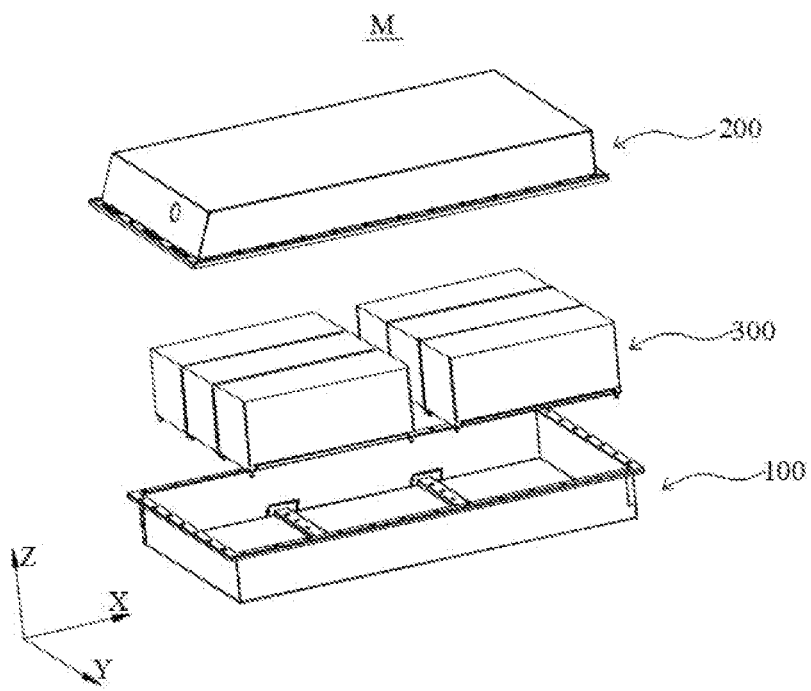
FIG. 5 is a schematic structural diagram of a battery pack according to a second aspect of this application.

FIG. 1 is a schematic structural diagram of part of a battery pack lower box body according to an embodiment of this application; FIG. 2 is an enlarged view of position A in FIG. 1; FIG. 3 is an exploded view of a box frame, stiffener, and stiffening beam in FIG. 1; FIG. 4 is a schematic cross-sectional view of a stiffener and stiffening beam in FIG. 1; and FIG. 5 is a schematic structural diagram of a battery pack according to a second aspect of the embodiments of this application.

Referring to FIG. 1 (Where only part of structure of the battery pack lower box body 100 is shown), the battery pack lower box body 100 includes a box frame 1, a base plate 2, a stiffening beam 3, and a stiffener 4.

The base plate 2 is arranged at the bottom of the box frame 1, for example, the base plate 2 is fixed to the bottom of the box frame 1 by welding; and the stiffening beam 3 is arranged inside a space enclosed by the box frame 1 and on top of the base plate 2, where the stiffening beam 3 can be arranged along a width direction Y, along a length direction X, or along both the width direction Y and the length direction X. In this embodiment, the stiffening beam 3 is arranged inside a space enclosed by the box frame 1 and on top of the base plate 2 along the width direction Y. X is the length direction of the battery pack M, Y is the width direction of the battery pack M, and Z is the height direction of the battery pack M.

The stiffening beam 3 is fixed to the box frame 1 via the stiffener 4, and the stiffener 4 is welded to the box frame 1 to form a weld seam 5 (see FIG. 2). A length of the weld seam 5 is kept greater than a sum of side lengths of a projection of the stiffening beam 3 onto the box frame 1. For example, in this embodiment, the weld seam 5 includes three sides that are mutually perpendicular. When the stiffening beam 3 is a rectangle, the projection of the stiffening beam 3 onto the box frame 1 also includes three sides that are mutually perpendicular (which are length of the weld seam in the related art). Therefore, structural strength of the weld seam 5 can be improved as long as the length of the weld seam 5 is kept greater than the sum of side lengths of the projection of the stiffening beam 3 onto the box frame 1.

The battery pack lower box body 100 provided by the embodiments of this application is welded to the box frame 1 via the stiffener 4, and the length of the weld seam 5 formed by welding the two is kept greater than the sum of side lengths of the projection of the stiffening beam 3 onto the box frame 1, increasing the length of the weld seam between the stiffening beam 3 and the box frame 1, thus enhancing structural strength of the weld seam, and thereby reducing the risk of breakage of the weld seam formed between the stiffening beam and the box frame.

It should be noted that both tensile force and shear force of the weld seam 5 are proportional to the length of the weld seam 5, and therefore greater length of the weld seam 5 means greater tensile and shear force of the weld seam 5, which can ensure better strength of the weld seam 5, reducing the risk of breakage of the weld seam.

In addition, the stiffening beam 3 of this embodiment is welded to the box frame 1 via provision of the stiffener 4, with two joints present between the three, which are, respectively, a joint between the stiffening beam 3 and the stiffener 4 and a joint (the weld seam 5) between the stiffener 4 and the box frame 1. Compared with the related art where one joint is provided between the stiffening beam and the box frame, this application provides two joints to disperse the acting force.

Specifically, when the battery pack has bumped for a long time or is subjected to severe collision, part of the acting force generated may act on the joint between the stiffening beam 3 and the stiffener 4, and the other part of the acting force may act on the weld seam 5, thus reducing the risk of breakage of the weld seam 5, which in turn increases overall structural strength of the battery pack.

In addition, when part of the acting force generated acts on the joint between the stiffening beam 3 and the stiffener 4, that part of acting force will continue to be transmitted to the stiffening beam 3. Because structural strength of the stiffethng beam 3 is much greater than structural strength of the weld seam 5, the overall structural strength of the battery pack is increased to some extent.

Referring to FIG. 1 and FIG. 5, the battery pack lower box body 100 further includes a battery fixing portion 6, where the battery fixing portion 6 is connected to inner sides of three adjacent box frames 1. Along the height direction Z, a plurality of first connecting holes 10 are provided in a top surface of the box frame 1, and the battery pack lower box body 100 is fixed to a battery-pack upper box body 200 via the first connecting holes 10. A plurality of second connecting holes 30 are provided in a top surface of the stiffening beam 3, and a plurality of third connecting holes 60 are provided in a top surface of the battery fixing portion 6. The second connecting holes 30 and the third connecting holes 60 can all be configured for installing and fixing one or more battery modules 300. In some embodiments, the first connecting holes 10, the second connecting holes 30, and the third connecting holes 60 may all be threaded holes, and bolts can be used to fix the battery pack lower box body 100 to the battery-pack upper box body 200 via the first connecting holes 10 and also fix the battery module 300 between the battery pack lower box body 100 and the battery-pack upper box body 200. It can be understood that not only the battery module 300 but also components such as a high-voltage box, a battery management unit (Battery Management Unit, BMU), a cell supervision circuit (Cell Supervision Circuit, CSC), a high-voltage copper bar, and a low-voltage wiring harness can be fixed between the battery pack lower box body 100 and the battery-pack upper box body 200.

In the battery pack lower box body 100, the box frame 1, the base plate 2, the stiffening beam 3, the stiffener 4, and the battery fixing portion 6 can all be made of aluminum alloy. Using aluminum alloy can reduce overall weight of the battery pack lower box body 100 to meet light-weight requirement for the battery pack, thereby increasing energy density of a battery pack using the battery pack lower box body 100 in this embodiment.

In practical applications, stiffening beams 3 of different widths can be selected as appropriate to specific requirements. Provided that the stiffening beam 3 is able to support the battery assembly, the stiffening beam 3 should have a smallest possible width to meet the light-weight requirement for the battery pack lower box body 100. Designing stiffening beams 3 of different widths can have corresponding impact on the size of the stiffener 4 and the length of the weld seam 5, which in turn affects the structural strength of the weld seam 5. Therefore, it is also very important to select stiffening beams 3 of different widths.

In some embodiments, the stiffening beam 3 and the stiffener 4 may be split structures or an integral structure. Being split structures, the stiffening beam 3 and the stiffener 4 need to be joined, increasing assembly steps but with low manufacturing costs; while being an integral structure, the stiffening beam 3 and the stiffener 4 need to be cast integrally, reducing assembly steps but with high manufacturing costs. For example, when the stiffening beam 3 and the stiffener 4 are split structures, the two can be joined using fastening methods such as threaded connection, welding, or plugging. In some embodiments, the assembly method of plugging followed by threaded connection allows the stiffening beam 3 and the stiffener 4 to be joined more reliably at lower costs.

Specifically, referring to FIG. 3, the stiffener 4 is provided with a first insertion hole 41, and the stiffening beam 3 is inserted into the first insertion hole 41. In such manner, an end portion of the stiffening beam 3 can be designed to be gradually narrowed to facilitate insertion of the stiffening beam 3 into the first insertion hole 41. In some embodiments, further, a part of the stiffening beam 3 that is inserted into a rear part of the first insertion hole 41 can be designed to be slightly larger than the first insertion hole 41 in size, allowing the stiffening beam 3 to be in interference fit with the stiffener 4, even sparing the subsequent threaded connection. Nevertheless, for reliability of the overall structure, a threaded connection is still adopted subsequently for further fixing.

The first insertion hole 41 can be a square hole or a round hole. In some embodiments, the first insertion hole 41 is a square hole, because a round hole is prone to relative rotation of the stiffening beam 3 and the stiffener 4, causing structural instability. When the first insertion hole 41 is a square hole, a cross section of the stiffening beam 3 is also square, allowing the stiffening beam 3 to fit more tightly in the first insertion hole 41.

In some embodiments, when the stiffening beam 3 and the stiffener 4 are connected threadedly, specifically, the stiffener 4 is further provided with a second insertion hole 42 communicating with the first insertion hole 41, the stiffening beam 3 is provided with a threaded hole 31, a threaded member 40 is provided inside the second insertion hole 42 and the threaded hole 31, and the stiffener 4 is fixed to the stiffening beam 3 by the threaded member 40. Referring to FIG. 4, the second insertion hole 42 may be a stepped hole, to facilitate insertion and fitting of the threaded member 40. For example, the threaded member 40 is a bolt with a flange face that can abut against a limiting face of the stepped hole to provide preload for the stiffening, beam 3 and the stiffener 4.

The second insertion hole 42 may run through up and down, or may only run to the first insertion hole 41. When the second insertion hole 42 runs through up and down, a longer threaded member 40 can be inserted and fitted into the second insertion hole 42. In the same way, the first insertion hole 41 can run through back and forth or nm slightly deeper than the second insertion hole 42. Either way is possible as long as the stiffening beam 3 and the stiffener 4 can fit together through plugging and threaded connection. It can be understood that when the first insertion hole 41 runs through back and forth and the second insertion hole 42 runs through up and down, the stiffener 4 is easier to process.

In some embodiments, along the width direction Y, two ends of the stiffening beam 3 are provided with limiting faces 32, the stiffener member 4 has a first welding face 43 welded to the box frame 1, and the limiting face 32 abuts against the first welding face 43. Providing the limiting face 32 can ensure that the depth of insertion of the stiffening beam 3 into the stiffener 4 meets the requirement. To be specific, when the limiting face 32 abuts against the first welding face 43, it means that the stiffening beam 3 and the stiffener 4 meet assembly requirements, and a next installation step, for example, inserting the threaded member 40, can proceed. In some embodiments, providing the limiting face 32 can further ensure that the threaded hole 31 is aligned with the second insertion hole 42 in installation, improving the installation efficiency.

It can be understood that a distance of the stiffening beam 3 to an outer end face along the width direction Y to the limiting face 32 should not exceed the depth of the first insertion hole 41, otherwise the assembly of the two may be difficult or impossible to be mounted to the box frame 1.

In some embodiments, an area of the first welding face 43 is larger than that of the projection of the stiffening beam 3 onto the box frame 1, so as to increase the length of the weld seam 5 by increasing the area of the first welding face 43. Certainly, when the area of the first welding face 43 is smaller than that of the projection of the stiffening beam 3 onto the box frame 1, the length of the weld seam 5 may not necessarily be reduced. For example, the projection of the stiffening beam 3 onto the box frame 1 is a square, the projection of the first welding face 43 onto the box frame 1 is a shape, a sum of whose side lengths is greater than a sum of side lengths of the square (which is a sum of side lengths of three sides). For example, at least one of the right-angled sides may be changed to an arc.

However, it can be understood that an increased area of the first welding face 43 can increase the length of the weld seam 5 and increase an contact area between the stiffener 4 and the box frame 1, thereby increasing strength of connection between the stiffener 4 and the stiffening beam 3 and connection between the stiffener 4 and the box frame 1.

Still referring to FIG. 2, the box frame 1 has a second welding face 11 welded to the first welding face 43, and the first welding face 43 is substantially flush with the second welding face 11, so that the stiffener 4 are reliably fixed to the box frame 1 and the stiffener 4 is welded to the box frame 1 with ease. For example, welding is more difficult when the first welding face 43 is not flush with the second welding face 11. Certainly, the first welding face 43 may also slightly protrude with respect to the second welding face 11.

Referring to FIG. 2 and FIG. 3, the box frame 1 is provided with a slot 13 formed by the second welding face 11 recessed inwards, and the stiffener 4 is accommodated in the slot 13, allowing the box frame 1 to acconunodate the stiffener 4.

In some embodiments, along the height direction Z, the box frame 1 has a bottom face 12, and the slot 13 runs through the bottom face 12 and the second welding face 11. Certainly, the slot 13 can alternatively be directly formed in the middle of the second welding face 11 without running through the bottom face 12. In this embodiment, the slot 13 runs through the bottom face 12 and the second welding face 11, thus increasing volumetric capacity of the battery pack lower box body 100.

It can be understood that the stiffener 4 provided in this embodiment is a rectangular solid, which facilitates the ease of processing the stiffener 4. Certainly the stiffener 4 may alternatively be of other regular of irregular shapes. For example, a side of the stiffener 4 close to the first welding face 43 may be designed as an enclosure structure that goes beyond the main body of the stiffener 4 (not shown in the figure), thus increasing an area of the first welding face 43, and further increasing the length of the weld seam 5.

When the stiffener 4 is a rectangular solid, the depth of the slot 13 is the same as the length of the stiffener 4 in an insertion direction; and when the stiffener 4 has an enclosure structure close to the first welding face 43, the enclosure structure abutting against the second welding face 11 can indicate that the stiffener 4 is completely inserted into the slot 13.

As shown in FIG. 5, another aspect of this application further provides a battery pack M, where the battery pack M includes a battery module 300, a battery-pack upper box body 200, and the battery pack lower box body 100 described above. After a battery module 300 is installed and fixed to the battery pack lower box body 100, the battery-pack upper box body 200 and the battery pack lower box body 100 are fixed to form the battery pack M. The battery pack M provides the same beneficial effects as the foregoing battery pack lower box body 100, which will not be repeated herein.

Still another aspect of this application further provides an apparatus, which can be mobile devices such as a vehicle, a ship, or a small aircraft. A vehicle is used as an example. The vehicle in this embodiment of this application may be a new energy vehicle. The new energy vehicle may be a battery electric vehicle, or may be a hybrid electric vehicle or an extended-range electric vehicle. The apparatus includes a driving source (not shown in the figure) and the battery pack M described above, where the driving source is configured to provide driving force for the apparatus, and the battery pack M is configured to provide electrical energy for the driving source. In some embodiments, the driving source may be an electric motor, and the electric motor is connected to wheels of the vehicle through a transmission mechanism to drive the vehicle.

An embodiment of this application further provides an assembly method of battery pack lower box body 100. A battery pack lower box body assembled using this assembly method is the foregoing battery pack lower box body 100.

Specifically, the assembly method includes the following steps:

S1. Fix the stiffening beam 3 to the stiffener 4.
S11. Insert the stiffening beam 3 into the first insertion hole 41 of the stiffener 4.

Specifically, an end portion of the stiffening beam 3 can be designed to be gradually narrowed to facilitate insertion of the stiffening beam 3 into the first insertion hole 41. In some embodiments, further, a part of the stiffening beam 3 that is inserted into a rear part of the first insertion hole 41 can be designed to be slightly larger than the first insertion hole 41 in size, so that the stiffening beam 3 is in interference fit with the stiffener 4.

S12. Connect the stiffening beam 3 to the stiffener 4 threadedly.

Specifically, the stiffener 4 is further provided with a second insertion hole 42 communicating with the first insertion hole 41, the stiffening beam 3 is provided with a threaded hole 31, a threaded member 40 is provided inside the second insertion hole 42 and the threaded hole 31, and the stiffener 4 is fixed to the stiffening beam 3 by the threaded member 40. Referring to FIG. 4, the second insertion hole 42 may be a stepped hole, to facilitate insertion and fitting of the threaded member 40. For example, the threaded member 40 is a bolt with a flange face that can abut against a limiting face of the stepped hole to provide preload for the stiffening beam 3 and the stiffener 4.

The second insertion hole 42 may run through up and down, or may only run to the first insertion hole 41. When the second insertion hole 42 runs through up and down, a longer threaded member 40 can be inserted and fitted into the second insertion hole 42. In the same way, the first insertion hole 41 can run through back and forth or run slightly deeper than the second insertion hole 42. Either way is possible as long as the stiffening beam 3 and the stiffener 4 can fit together through plugging and threaded connection. It can be understood that when the first insertion hole 41 runs through back and forth and the second insertion hole 42 runs through up and down, the stiffener 4 is easier to process.

S2. Place the stiffener 4 in the slot 13 of the box frame 1 and then perform welding.

This may be implemented by first placing the stiffener 4 in the slot 13 of the box frame 1, and then simultaneously welding the stiffener 4 to the box frame 1 and welding the base plate 2 to the box frame 1; or by first placing the stiffener 4 in the slot 13 of the box frame 1, then welding the stiffener 4 to the box frame 1, and then welding the base plate 2 to the box frame 1; or by first placing the stiffener 4 in the slot 13 of the box frame 1, and then welding the base plate 2 to the box frame 1, and then welding the stiffener 4 to the box frame 1.

Specifically, the box frame 1 is provided with the slot 13 formed by the second welding face 11 recessed inwards, and the stiffener 4 is accommodated in the slot 13, allowing the box frame 1 to accommodate the stiffener 4.

In some embodiments, along the height direction Z, the box frame 1 has a bottom face 12, and the slot 13 runs through the bottom face 12 and the second welding face 11. Certainly, the slot 13 can alternatively be directly formed in the middle of the second welding face 11 without running through the bottom face 12. In this embodiment, the slot 13 runs through the bottom face 12 and the second welding face 11, thus increasing volumetric capacity of the battery pack lower box body 100.

It can be understood that the stiffener 4 provided in this embodiment is a rectangular solid, which facilitates the ease of processing the stiffener 4. Certainly, the stiffener 4 may alternatively be of other regular or irregular shapes. For example, a side of the stiffener 4 close to the first welding face 43 may be designed as an enclosure structure that goes beyond the main body of the stiffener 4 (not shown in the figure), thus increasing an area of the first welding face 43, and further increasing the length of the weld seam 5.

When the stiffener 4 is a rectangular solid, the depth of the slot 13 is the same as the length of the stiffener 4 in an insertion direction; and when the stiffener 4 has an enclosure structure close to the first welding face 43, the enclosure structure abutting against the second welding face 11 can indicate that the stiffener 4 is completely inserted into the slot 13.

In summary, the battery pack lower box body 100 assembled using the foregoing assembly method has a much stronger weld seam, reducing the risk of breakage of the weld seam formed between the stiffening beam and the box frame.

The foregoing descriptions are merely some embodiments of this application, but are not intended to limit this application. Any modification, equivalent replacement, or improvement made without departing from the spirit and principle of this application shall fall within the protection scope of this application.

What is claimed is:

1. A battery pack lower box body, comprising:
    a box frame;
    a base plate arranged at the bottom of the box frame;
    a stiffening beam arranged inside a space enclosed by the box frame and on top of the base plate; and
    a stiffener, wherein the stiffening beam is fixed to the box frame via the stiffener, and the stiffener is welded to the box frame to form a weld seam; wherein
    a length of the weld seam is kept greater than a sum of side lengths of a projection of the stiffening beam onto the box frame.

2. The battery pack lower box body according to claim 1, wherein the stiffening beam and the stiffener are an integral structure.

3. The battery pack lower box body according to claim 1, wherein the stiffening beam and the stiffener are split structures, the stiffener is provided with a first insertion hole, and the stiffening beam is inserted into the first insertion hole.

4. The battery pack lower box body according to claim 3, wherein the stiffener is further provided with a second insertion hole communicating with the first insertion hole, and the stiffening beam is provided with a threaded hole; and
    a threaded member is provided inside the second insertion hole and the threaded hole, and the stiffening beam is fixed to the stiffener by the threaded member.

5. The battery pack lower box body according to claim 3, wherein along a width direction of the stiffening beam, two ends of the stiffening beam are provided with limiting faces, and one of the limiting faces abuts against the first welding face.

6. The battery pack lower box body according to claim 5, wherein an area of the first welding face is larger than that of a projection of the stiffening beam onto the box frame.

7. The battery pack lower box body according to claim 5, wherein the box frame has a second welding face welded to the first welding face, and the first welding face is flush with the second welding face.

8. The battery pack lower box body according to claim 7, wherein the slot is formed by the second welding face recessed inwards, and the stiffener is accommodated in the slot.

9. A battery pack, comprising a battery module, a battery-pack upper box body, and the battery pack lower box body according to claim 1, the battery-pack upper box body is fixed to the battery pack lower box body, and the battery module is accommodated in the battery-pack upper box body and the battery pack lower box body.

10. An apparatus, comprising a driving source and the battery pack according to claim 9, wherein the driving source is configured to provide driving force for the apparatus, and the battery pack is configured to provide electrical energy for the driving source.

11. An assembly method of battery pack lower box body, comprising:
    providing a box frame comprising a base plate;
    arranging a stiffening beam inside a space enclosed by the box frame and on top of the base plate;
    fixing the stiffening beam to the box frame via a stiffener;
    accommodating the stiffener in a slot formed in the box frame; and
    welding a first welding surface of the stiffener flush with the box frame to form a weld seam, with a length of the weld seam kept greater than a sum of side lengths of a projection of the stiffening beam onto the box frame.

* * * * *